United States Patent
Kapatral et al.

(10) Patent No.: US 11,973,407 B2
(45) Date of Patent: Apr. 30, 2024

(54) THERMAL MANAGEMENT TECHNIQUES FOR ELECTRIC MOTORS

(71) Applicants: Shreyas Kapatral, Oakland Township, MI (US); Srihari Gangaraj, Troy, MI (US)

(72) Inventors: Shreyas Kapatral, Oakland Township, MI (US); Srihari Gangaraj, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 120 days.

(21) Appl. No.: 17/673,934

(22) Filed: Feb. 17, 2022

(65) Prior Publication Data

US 2022/0263384 A1 Aug. 18, 2022

Related U.S. Application Data

(60) Provisional application No. 63/150,623, filed on Feb. 18, 2021.

(51) Int. Cl.
| | |
|---|---|
| *H02K 9/197* | (2006.01) |
| *B60L 3/00* | (2019.01) |
| *B60L 15/20* | (2006.01) |
| *H02K 1/18* | (2006.01) |

(52) U.S. Cl.
CPC ............ *H02K 9/197* (2013.01); *B60L 3/0061* (2013.01); *B60L 15/20* (2013.01); *H02K 1/18* (2013.01); *B60L 2240/36* (2013.01)

(58) Field of Classification Search
CPC .... B60L 15/20; B60L 2240/36; B60L 3/0061; H02K 1/18; H02K 1/32; H02K 9/19; H02K 9/197
See application file for complete search history.

(56) References Cited

U.S. PATENT DOCUMENTS

| | | | |
|---|---|---|---|
| 6,864,604 B2 | 3/2005 | Nakano et al. | |
| 7,156,195 B2 | 1/2007 | Yamagishi et al. | |
| 7,160,086 B2 | 1/2007 | Maceyka et al. | |
| 8,242,646 B2* | 8/2012 | Tatematsu | B60L 7/14 |
| | | | 310/60 A |
| 10,116,178 B2* | 10/2018 | Horii | H02K 1/28 |
| 2015/0214817 A1* | 7/2015 | Kim | H02K 9/197 |
| | | | 310/54 |
| 2015/0280524 A1* | 10/2015 | Lassila | H02K 9/19 |
| | | | 310/54 |
| 2015/0288254 A1* | 10/2015 | Söderholm | H02K 1/32 |
| | | | 310/54 |
| 2019/0115805 A1* | 4/2019 | Do | H02K 9/19 |

FOREIGN PATENT DOCUMENTS

JP 2011114986 A 6/2011

* cited by examiner

*Primary Examiner* — Naishadh N Desai
(74) *Attorney, Agent, or Firm* — Jeremy J. Klobucar

(57) ABSTRACT

Thermal management techniques for an electric motor of a vehicle, the electric motor comprising a rotor and a stator include an oil supply system configured to supply oil for cooling the electric motor, end plates defined by the rotor, the end plates defining a first portion of an internal oil channel configured to route oil through the rotor to thereby cool the rotor, and a hollow rotor shaft defined by the rotor, the hollow rotor shaft defining a second portion of the internal oil channel, wherein the end plates are configured to retain the rotor in place and further define external oil channels configured to spray/splash the oil that flowed through the internal oil channel onto windings of the stator to thereby cool the stator.

13 Claims, 4 Drawing Sheets

THERMAL MANAGEMENT TECHNIQUES FOR ELECTRIC MOTORS

CROSS-REFERENCE TO RELATED APPLICATION(S)

The present application claims the benefit of U.S. Provisional Application No. 63/150,623, filed on Feb. 18, 2021. The disclosure of the above-identified application is incorporated herein by reference in its entirety.

FIELD

The present application generally relates to electric motors and, more particularly, to thermal management techniques for electric motors, particularly for vehicle powertrains.

BACKGROUND

A conventional electric motor includes a stator and a rotor. The stator is supplied with energy (i.e., current) to generate a magnetic field that causes the rotor to rotate and generate torque. The operation of an electric motor generates heat which causes the temperature of these components inside the electric motor to rise. One example implementation of an electric motor is in a vehicle's torque generating system or transmission for propulsion. Conventional electric motors are typically directly cooled by employing oil spray/splash, channeled oil flow in direct contact with the electric motor's surfaces, and/or water jackets to dissipate heat. While such electric motor thermal management techniques do work for their intended purpose, there remains a desire for improvement in the relevant art.

SUMMARY

According to one example aspect of the invention, a thermal management system for an electric motor of a vehicle, the electric motor comprising a rotor and a stator is presented. In one exemplary implementation, the thermal management system comprises an oil supply system configured to supply oil for cooling the electric motor, end plates defined by the rotor, the end plates defining a first portion of an internal oil channel configured to route oil through the rotor to thereby cool the rotor, and a hollow rotor shaft defined by the rotor, the hollow rotor shaft defining a second portion of the internal oil channel, wherein the end plates are configured to retain the rotor in place and further define external oil channels configured to spray/splash the oil that flowed through the internal oil channel onto windings of the stator to thereby cool the stator.

In some implementations, the second portion of the internal oil channel is an inner face surface defined by the hollow rotor shaft. In some implementations, the thermal management system further comprises a set of fins or baffles defined by the inner face surface for increased surface area and cooling performance. In some implementations, the external oil channels further comprise existing rotor air gaps relative to the stator. In some implementations, the thermal management system further comprises a set of turbulators each configured to promote turbulent oil flow to enhance a heat transfer coefficient. In some implementations, the rotor is both internally and externally cooled via the internal and external oil channels to thereby improve cooling performance and thereby improve performance/efficiency of the electric motor.

According to another example aspect of the invention, a thermal management method for an electric motor of a vehicle, the electric motor comprising a rotor and a stator is presented. In one exemplary implementation, the thermal management method comprises providing an oil supply system configured to supply oil for cooling the electric motor, providing end plates defined by the rotor, the end plates defining a first portion of an internal oil channel configured to route oil through the rotor to thereby cool the rotor, and providing a hollow rotor shaft defined by the rotor, the hollow rotor shaft defining a second portion of the internal oil channel, wherein the end plates are configured to retain the rotor in place and further define external oil channels configured to spray/splash the oil that flowed through the internal oil channel onto windings of the stator to thereby cool the stator.

In some implementations, the second portion of the internal oil channel is an inner face surface defined by the hollow rotor shaft. In some implementations, the thermal management method further comprises providing a set of fins or baffles defined by the inner face surface for increased surface area and cooling performance. In some implementations, the external oil channels further comprise existing rotor air gaps relative to the stator. In some implementations, the thermal management method further comprises providing a set of turbulators each configured to promote turbulent oil flow to enhance a heat transfer coefficient. In some implementations, the rotor is both internally and externally cooled via the internal and external oil channels to thereby improve cooling performance and thereby improve performance/efficiency of the electric motor. In some implementations, the thermal management method further comprises controlling, by a controller of the electric motor, the oil supply system to supply the oil to the internal and external oil channels to thereby improve performance/efficiency of the electric motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

Figure 3:
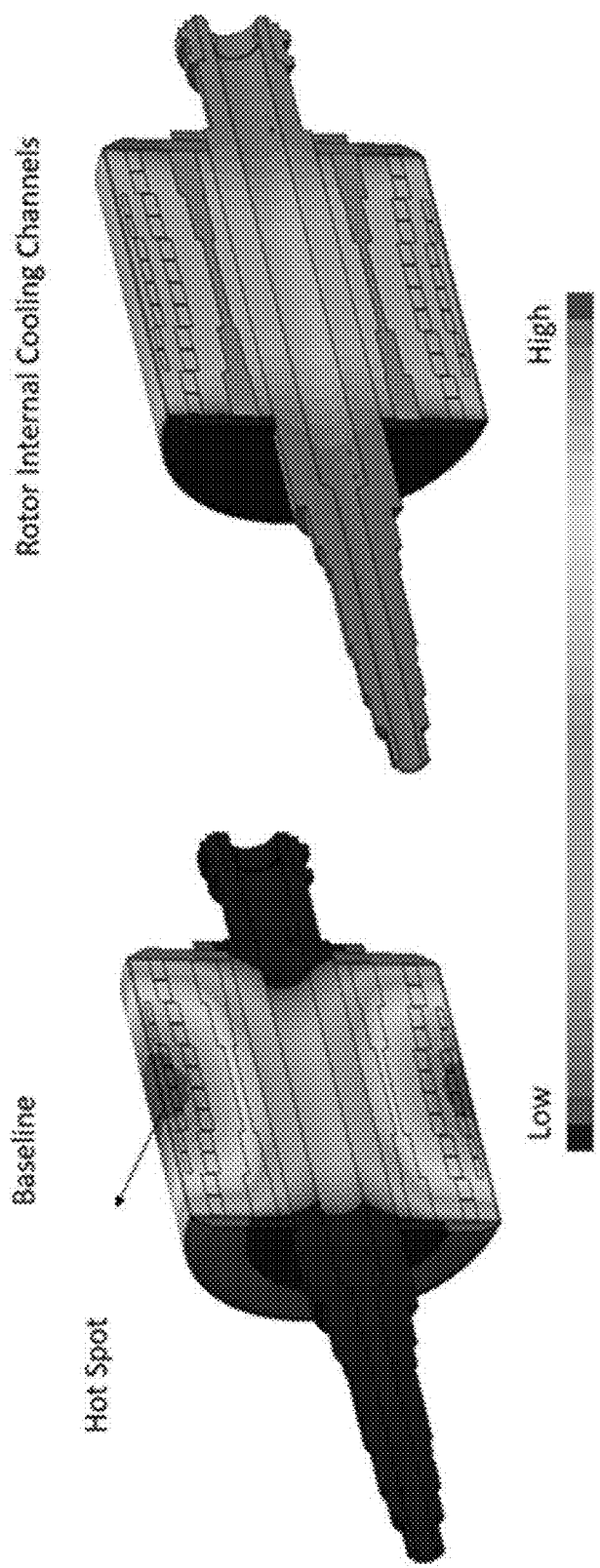
FIG. 3 is illustrates a comparison of rotor temperatures for conventional (left) and an example of the thermal management system (right) according to the principles of the present application.

As previously discussed, the operation of an electric motor generates heat which causes the temperature of the components inside the electric motor to rise. The two important components in the electric motor that need to be cooled are the magnets that are housed within the rotor and copper windings in the stator. The left portion of FIG. 3 shows an example temperature distribution of rotor without internal rotor cooling channels. The magnets in the rotor are typically demagnetized at temperatures above ~180 degrees Celsius (based on the type of magnet) and motor operation is often constrained to ensure that the magnet temperature does not exceed this threshold. The copper windings in the stator have an insulating layer that degrades at temperatures above ~180 degrees. The proposed thermal management system of the present application aims to address the cooling of these two components in the electric motor by using novel cooling path for the oil.

One conventional electric motor thermal management system is air cooling. Air cooled electric machines use forced convection to cool the stator and rotor. Typically, a fan on one end of the shaft pumps air through the machine when the rotor rotates, providing cooling. This technique also employs fins on external surfaces of the stator housing to further enhance the heat transfer. Another conventional electric motor thermal management technique is water jacket cooling. With increase in power densities of electrified powertrains, there is a need to increase the heat dissipation in the machines as well. This has led to increased adoption of liquid cooling in machines.

Previously, liquid cooling was limited to water jacket cooled stator, while the rotor remained air cooled. Water jacket cooled machines flow coolant (typically ethylene glycol and water in a certain ratio) through channels within the motor housing to extract heat from the stator. Until recently, hollow concentric shafts have been employed was water jackets to route the coolant though the shaft to cool the rotor as well. The liquid cooling thus described is indirect as the cooling media is not in contact with surfaces generating heat.

Yet another conventional electric motor thermal management technique is oil cooling. Oil cooling architectures use oil spray/splash directly on the motor surfaces for cooling. The heat is dissipated from "first hand" contact of the cooling media and the heat sources. There is no additional material or interface that can add thermal resistance between the heat sources and the coolant. Hence this method is typically referred to as "direct-oil-cooling". As previously mentioned, there are two main approaches for the oil spray. One is spraying the oil from outer diameter of the stator towards the rotor center, and the other is oil spray from the center towards the stator, driven by rotor rotation. Some cooling architectures may use a combination of both these approaches.

In the first approach the oil is sprayed directly on the end windings/stator through nozzles in the motor housing or end covers. In the second approach the oil is sprayed from the shaft passages towards the end-windings and stator laminations. In this case oil spray is driven by centrifugal forces caused by the rotation of the rotor. Both these approaches primarily cool the rotor by heat transfer via external rotor surfaces. The external rotor surfaces are mainly the rotor ends, exposed to the cooling media via end-plate surfaces and the rotor's outer circumferential area that forms the air gap.

No oil cooling designs utilize the inner face of the hollow shaft as heat transfer surfaces through which the oil is routed before being splashed on the stator. In these described approaches, the oil does not flow within the rotor hence oil wetting is limited to external surfaces or inner shaft surfaces only. In either case, the stator is cooled by oil spray to the end-windings after which the oil flow is driven by gravity to the sump.

Most of the direct-oil-cooling methods described previously cool the rotor by heat transfer from external surfaces, mainly from the end-plates and the outer cylindrical area forming the air gap. For rotors made by stacking steel laminations, the axial thermal conductivity of the rotor is an order lower than the radial and circumferential thermal conductivities. This results in elevated temperatures in the core of the rotor as shown in the left portion of FIG. 3. The thermal contact resistance between the end-plate and the rotor laminates lowers heat dissipation. Any attempt to improve the heat transfer from the end-plates by adding fins or baffles can contribute to additional windage losses in the machine that increases with the rotational speed.

In cooling architectures employing inner shaft surfaces for rotor cooling, the thermal contact resistance between the rotor and outer surface of the shaft can hinder heat loss. The total surface area available for heat transfer from the shaft is lower due to smaller radius of the shaft as compared rotor inner cooling channels as proposed. Cooling design solutions which utilize the oil spray from rotor shaft to the end-windings have limited control over the oil flow once the oil exits the shaft. The longer spray path from the shaft to the end-windings increases the chances of jet breakup and oil aeration at higher rotational speeds. Any deviation from the oil jet structure can reduce the effectiveness of the direct-cooling. Guiding oil spray from the shaft to the end-windings may require additional design changes in the end-plates for better directional control which can add to additional cost and rotational mass.

Under water jacket based cooling techniques, running coolant through concentric shafts for rotor cooling requires expensive sealing technology that allows for rotation of adjacent surfaces. Damage of these seals can lead to coolant leakage which become a huge safety hazard. Usage of uniquely shaped shafts for routing the coolant can increase the production costs requiring advanced manufacturing techniques that limit the technology from being adopted into mass production. As a result, the improved electric motor thermal management techniques of the present application are presented. These techniques involve cooling the rotor by routing oil flow through internal channels and rerouting the rotor oil to cool the stator by oil spray.

Figure 1A:
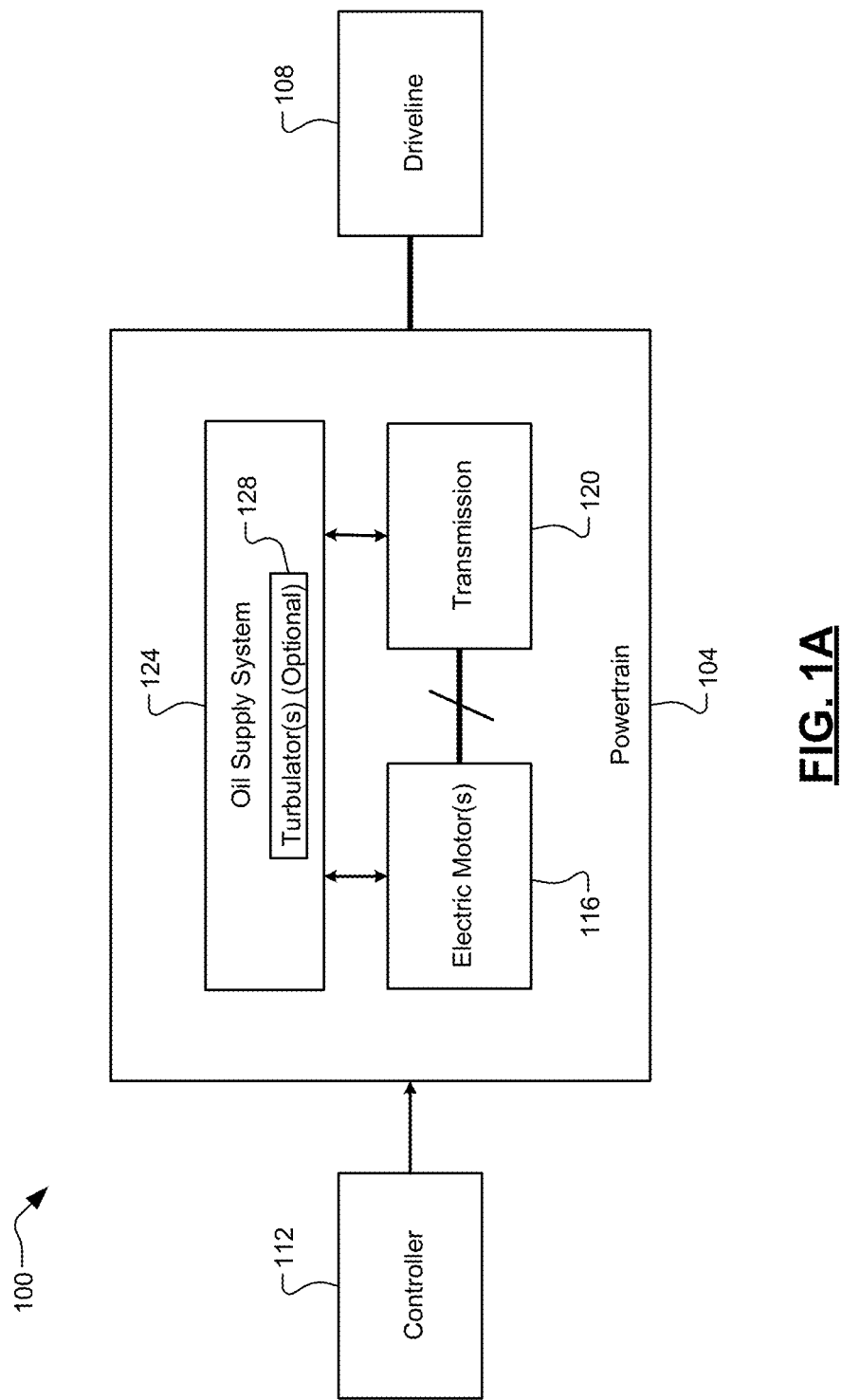
FIGS. 1A-1B are a functional block diagram and a cross-sectional view of an example thermal management system for an electric motor according to the principles of the present application.
Figure 1B:
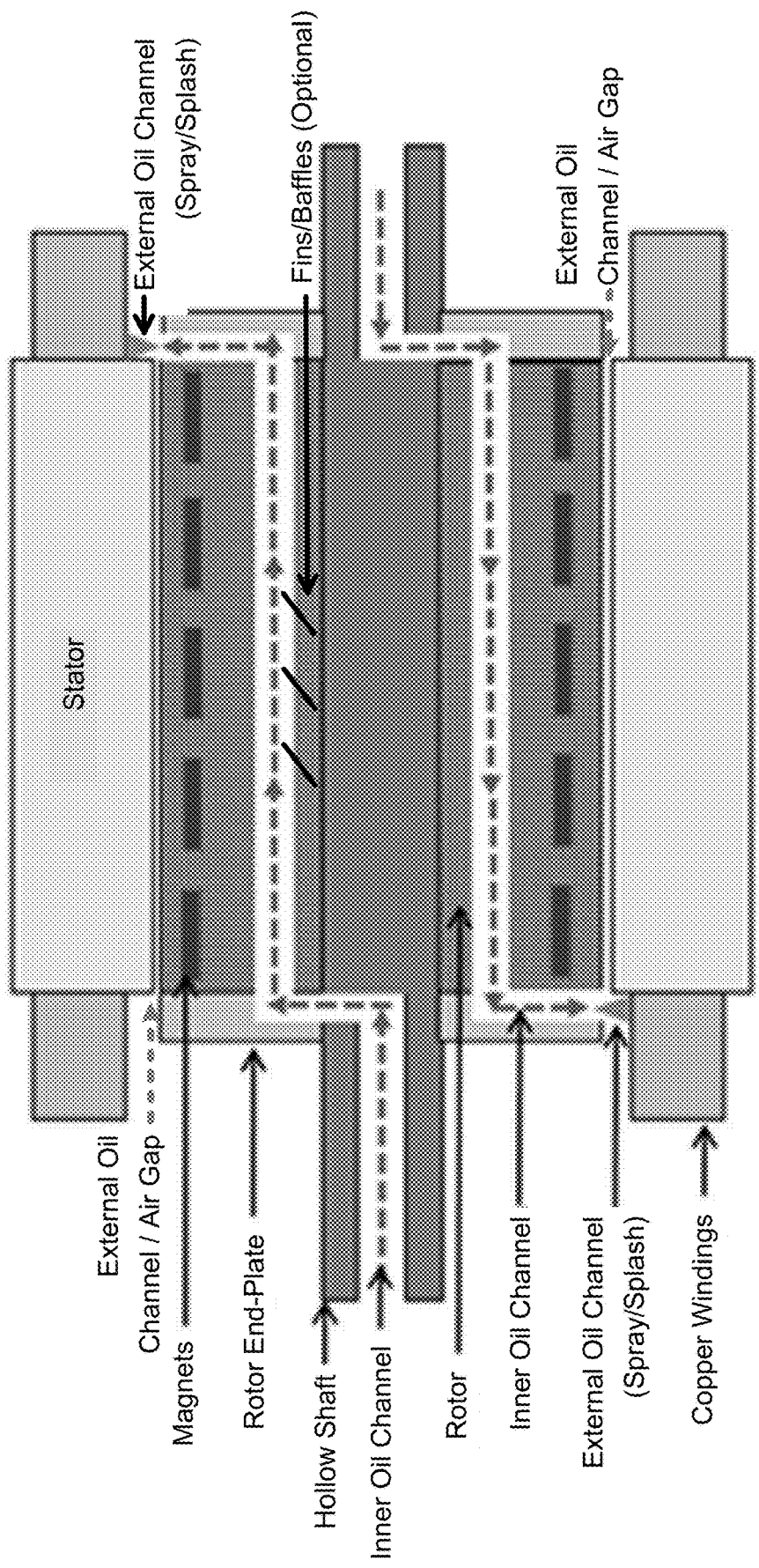

FIGS. 1A-1B show the main components in the electric motor and the oil flow path that enables cooling the electric motor. A vehicle 100 generally comprises a powertrain 104 that generates and transfers drive torque to a driveline 108 for vehicle propulsion. The powertrain 104 is controlled by a controller 112, such as to achieve a desired/requested amount of drive torque. The powertrain 104 includes one or more electric motors 116 (e.g., multi-phase traction or drive motors) that generate drive torque and are selectively coupled to a transmission 120 for transfer of the drive torque to the driveline 108. An oil supply system 124 (pump(s), valve(s), etc.) is controlled by the controller 112 to supply/recirculate oil to both the electric motor(s) 116 and the transmission 120. The oil supply system 124 optionally comprises one or more sets of turbulators 128 that turbulate (turn/spin) the oil flow to thereby enhance a heat transfer coefficient. The two new components for the cooling mechanism include (1) internal channels in the rotor to allow oil flow axially and exit at the ends and (2) rotor end-plates optimized to spray oil on the stator windings. The oil is pumped from both ends of the shaft as indicated by oil inlet. The rotor end-plate is designed to allow oil to flow from the shaft and through the rotor as shown in the arrows. The oil exits from the rotor end-plate as a conical jet to spray oil on the copper-windings, and may also flow through existing air gaps between the stator and rotor as shown.

Figure 2:
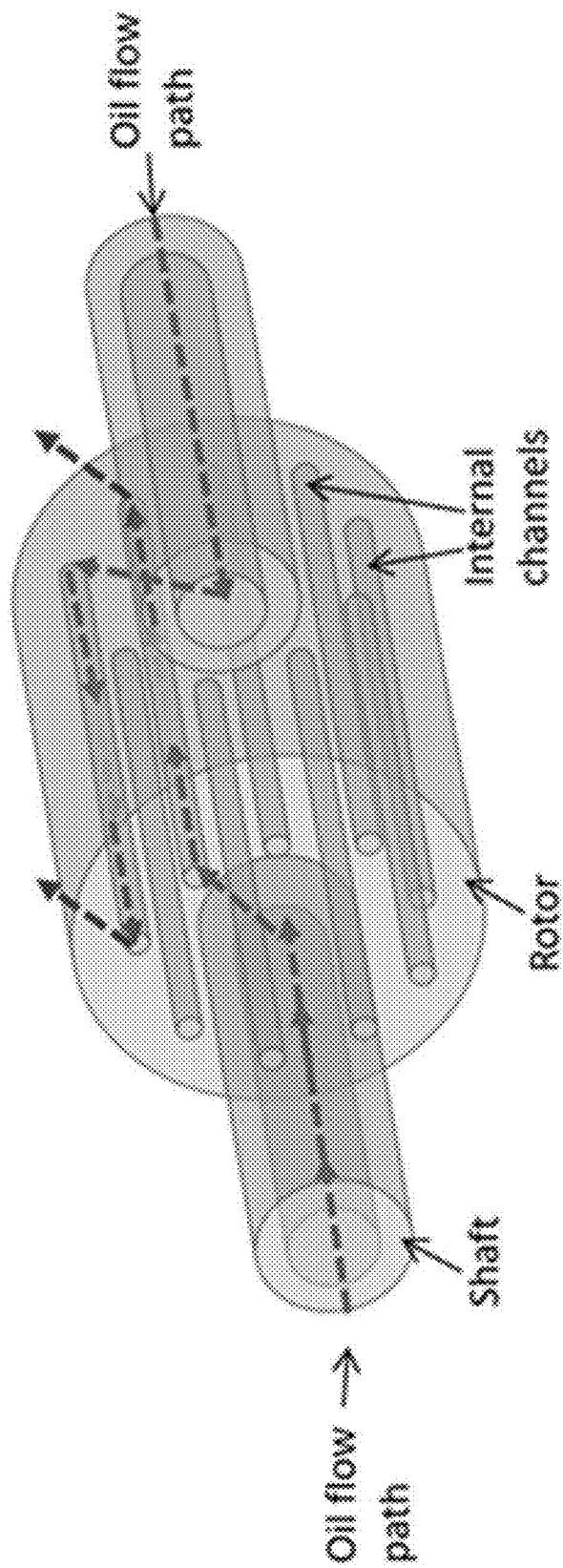
FIG. 2 is a schematic view of an example oil flow path inside a rotor of a thermal management system according to the principles of the present application.

The principle of operation of the internal channels in the rotor is schematically shown in FIG. 2. The cooler oil enters on both ends of the shaft and axially traverses through the rotor taking the heat away from the interior of the rotor and warm oil exits from the rotor radially. The proposed cooling design is effective in cooling the rotor along with delivering targeted oil spray to the end-windings. The oil channels running axially enhance heat transfer from the bulk of the rotor as opposed to cooling only the rotor ends. The internal rotor cooling channels run closer to the permanent magnets hence eliminating any additional thermal contact resistances arising from shaft-rotor and end-plate-rotor interfaces. The end-windings are also sprayed from rotor ends, in close proximity to end-windings (shorter spray path).

The overall surface area available for heat transfer in enhanced from rotor internal cooling channels while retaining the ability to cool the rotor from external surfaces as well. The proposed design enables delivery of the coolest oil in the system to the rotor core as opposed to relying oil splashed from housing/stator surface which will be warmer. Further, rotor core losses and permanent magnet losses increase at higher rotational speeds. Existing designs are plagued by oil film thinning and oil aeration at higher rotation speeds that can reduce the heat transfer. In this case the oil is forced to flow axially in contact with upper surfaces of the rotor channels due centrifugal force. These centrifugal forces acting on the oil increase at elevated rotational speed that ensure oil-rotor contact.

For cooling the end-winding, the oil jet velocities depend on the nozzle geometry and oil flow rates in a fixed nozzle exit. In this case the oil velocities are a function of the rotational speed of the rotor. Increased oil velocities are observed at higher rotational speeds (maximum motor speeds are in rage of 16000-18000 rpm). The oil spray is targeted to the end-windings on either sides that help cool the windings effectively. In addition, better oil flow control/metering is achievable by channeling of the oil flow within the rotor to provide better control over oil flow rate and oil distribution than splash base methods. The end-windings are wetted by oil spray from the end-plate passage exits located at the air gap. Shorter oil spray path provides better directionality.

The proposed design cools the rotor primarily by internal oil passages while retaining the ability to cool the rotor from external surfaces, similar to other designs utilizing direct-oil-cooling. Conventional electric motor thermal management techniques do not route the oil within the rotor core. This allows for cooling the bulk of the rotor and permanent magnets as compared to cooling the rotor ends. Further, the oil exiting the rotor is reutilized to spray cool the end-windings stator which reduces the overall oil demand for motor cooling. The stator is also cooled by oil spray from rotating oil channels within the end-plates. The oil is sprayed from the outer diameter of the rotor as opposed to shaft outlets. This offers better control over oil distribution than shaft spray techniques.

Further, the routing of the oil within the rotor core and oil spray to the end-windings is achieved by oil passage design of the end-plates. The end-plate oil passage designs are unique to the proposed cooling solution. The end-plates double in functionality of retaining the rotor in place and routing/metering the oil. A single end-plate design is mirrored on either end of the rotor promoting reuse of the end-plates and simplifying manufacturing/assembly. Lastly, the heat dissipation to the rotor oil cooling channels can be further enhanced by (1) internal fins/baffles that increase the overall surface area to increase heat transfer and/or (2) turbulators that are structures that promote turbulent flow to enhance heat transfer coefficient.

In summary, one exemplary implementation of the electric motor thermal management system of the present disclosure comprises a cooling design for an electric drive motor of a hybrid transmission using an inner face of a hollow rotor shaft as heat transfer surfaces thru which oil is routed before being splashed on a stator that (1) cools the rotor primarily by internal oil passages while retaining the ability to cool the rotor from external surfaces, similar to other designs utilizing direct-oil-cooling, (2) that stator is cooled by oil spray from rotating oil channels w/in end-plates, end-plates doubling in functionality of retaining the rotor in place and routing the oil thru existing rotor air gaps to cool rotor magnets, and (3) heat dissipation to rotor oil cooling channels can be further enhanced by internal fins/baffles that increase the overall surface area to increase heat transfer and/or turbulators that are structures that promote turbulent flow to enhance heat transfer coefficient It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A thermal management system for an electric motor of a vehicle, the electric motor comprising a rotor and a stator, the thermal management system comprising:
   an oil supply system configured to supply an oil for cooling the electric motor;
   a solid rotor core portion defined by the rotor, the solid rotor core portion defining a first portion of an internal oil channel configured to route the oil therethrough to cool the solid rotor core portion, the first portion of the internal oil channel being arranged proximate to an outer edge of the solid rotor core portion;
   hollow rotor shaft portions defined by the rotor, the hollow rotor shaft portions defining a second portion of the internal oil, channel therethrough, wherein the first and second portions of the internal oil channel are fluidly connected; and
   end plates defined by the rotor, the end plates being configured to retain the solid rotor core portion in place and further defining external oil channels fluidly connected to the internal oil channel, arranged substantially perpendicular to an axial direction of the rotor, and being configured to spray/splash the oil that flowed through the internal oil channel directly onto or towards windings of the stator to thereby cool the stator.

2. The thermal management system of claim 1, wherein the second portion of the internal oil channel is an inner face surface defined by the hollow rotor shaft portions.

3. The thermal management system of claim 2, further comprising a set of fins or baffles defined by the first portion of the internal oil channel for increased surface area and cooling performance.

4. The thermal management system of claim 1, wherein the external oil channels further comprise existing rotor air gaps relative to the stator.

5. The thermal management system of claim 1, further comprising a set of turbulators each configured to promote turbulent oil flow to enhance a heat transfer coefficient.

6. The thermal management system of claim 1, wherein the rotor is both internally and externally cooled via the internal and external oil channels and the stator is externally cooled via the external oil channels to thereby improve cooling performance and thereby improve performance/efficiency of the electric motor.

7. A thermal management method for an electric motor of a vehicle, the electric motor comprising a rotor and a stator, the thermal management method comprising:
providing an oil supply system configured to supply an oil for cooling the electric motor;
providing a solid rotor core portion defined by the rotor, the solid rotor core portion defining a first portion of an internal oil channel configured to route the oil therethrough to cool the solid rotor core portion, the first portion of the internal oil channel being arranged proximate to an outer edge of the solid rotor core portion;
providing hollow rotor shaft portions defined by the rotor, the hollow rotor shaft portions defining a second portion of the internal oil, channel therethrough, wherein the first and second portions of the internal oil channel are fluidly connected; and
providing end plates defined by the rotor, the end plates being configured to retain the solid rotor core portion in place and further defining external oil channels fluidly connected to the internal oil channel, arranged substantially perpendicular to an axial direction of the rotor, and being configured to spray/splash the oil that flowed through the internal oil channel directly onto or towards windings of the stator to thereby cool the stator.

8. The thermal management method of claim 7, wherein the second portion of the internal oil channel is an inner face surface defined by the hollow rotor shaft portions.

9. The thermal management method of claim 8, further comprising providing a set of fins or baffles defined by the first portion of the internal oil channel for increased surface area and cooling performance.

10. The thermal management method of claim 7, wherein the external oil channels further comprise existing rotor air gaps relative to the stator.

11. The thermal management method of claim 7, further comprising providing a set of turbulators each configured to promote turbulent oil flow to enhance a heat transfer coefficient.

12. The thermal management method of claim 7, wherein the rotor is both internally and externally cooled via the internal and external oil channels and the stator is externally cooled via the external oil channels to thereby improve cooling performance and thereby improve performance/efficiency of the electric motor.

13. The thermal management method of claim 12, further comprising controlling, by a controller of the electric motor, the oil supply system to supply the oil to the internal and external oil channels to thereby improve performance/efficiency of the electric motor.

\* \* \* \* \*